No. 687,915. Patented Dec. 3, 1901.
C. CHAMBERS, Jr.
BRICK MACHINE.
(Application filed June 29, 1900.)
(No Model.) 2 Sheets—Sheet 1.
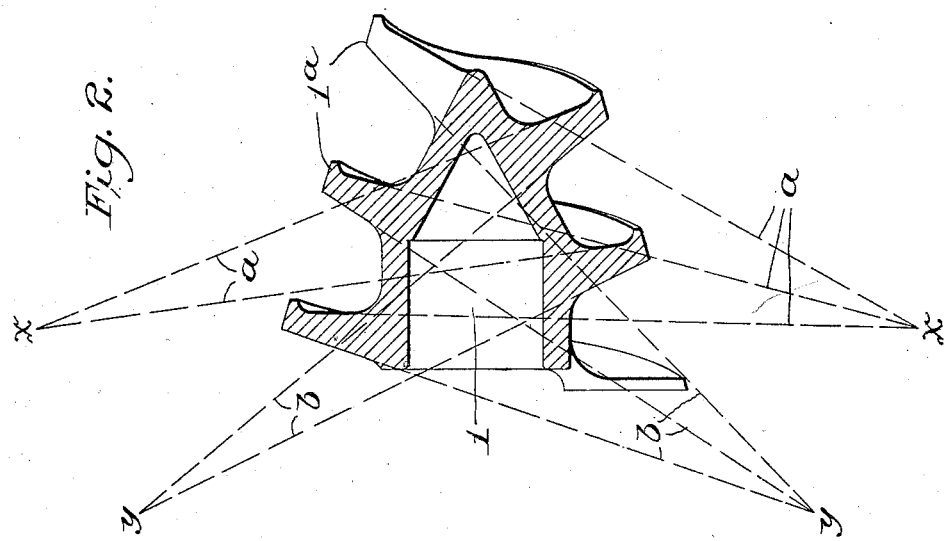
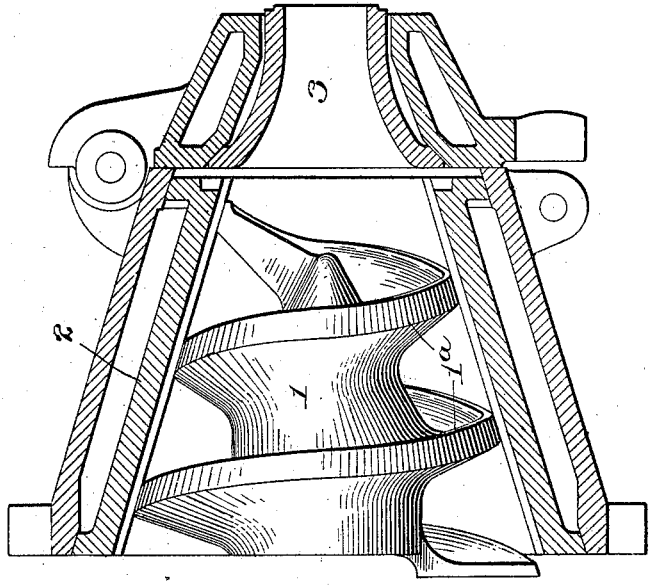
WITNESSES:
INVENTOR:
Cyrus Chambers Jr.
BY
Joshua Pusey,
ATTORNEY.

No. 687,915. Patented Dec. 3, 1901.
C. CHAMBERS, Jr.
BRICK MACHINE.
(Application filed June 29, 1900.)

(No Model.) 2 Sheets—Sheet 2.

WITNESSES:
A. V. Groot
Walter C. Pusey

INVENTOR:
Cyrus Chambers, Jr.
BY Joshua Pusey,
ATTORNEY.

UNITED STATES PATENT OFFICE.

CYRUS CHAMBERS, JR., OF OVERBROOK, PENNSYLVANIA, ASSIGNOR TO CHAMBERS BROTHERS COMPANY, OF PHILADELPHIA, PENNSYLVANIA, A CORPORATION OF PENNSYLVANIA.

BRICK-MACHINE.

SPECIFICATION forming part of Letters Patent No. 687,915, dated December 3, 1901.

Application filed June 29, 1900. Serial No. 22,094. (No model.)

*To all whom it may concern:*

Be it known that I, CYRUS CHAMBERS, Jr., a citizen of the United States, residing at Overbrook, Montgomery county, State of Pennsylvania, have invented certain new and useful Improvements in Brick-Machines, of which the following is a full, clear, and exact description, reference being had to the accompanying drawings, of which—

Figure 4:
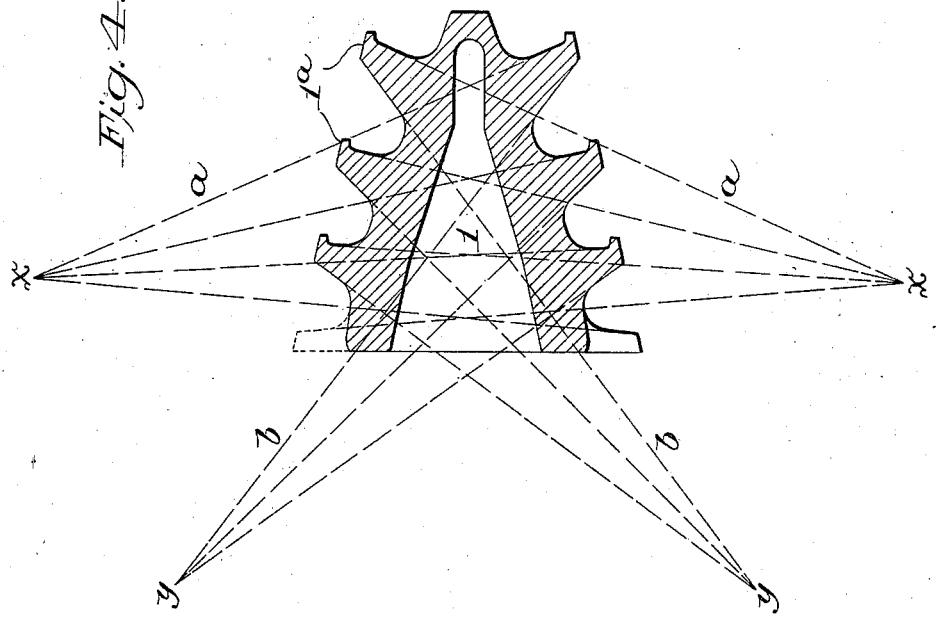
Figure 3:
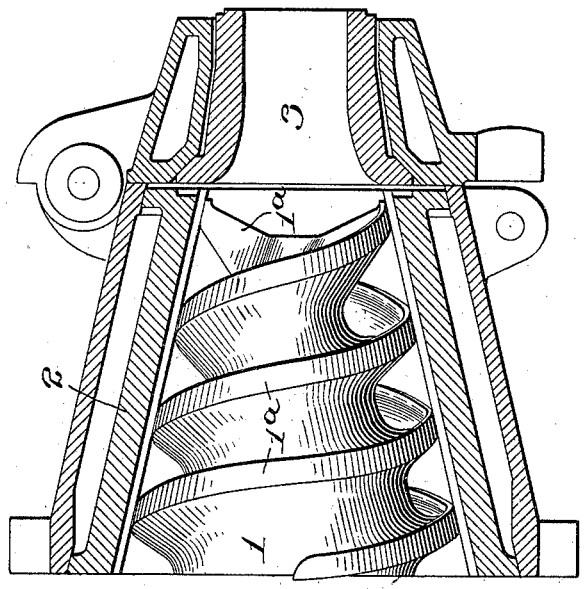

Figure 1 is a longitudinal horizontal section of the screw-case and former-die of a brick-machine in which my invention is embodied. Fig. 2 is a longitudinal section of the expressing-screw detached. Fig. 3, Sheet 2, and Fig. 4 are views similar to Figs. 1 and 2 of a modified form of the invention.

The invention relates more especially to that kind of brick-machines wherein the clay is expressed in a continuous bar from a suitable former-die by means of a tapering rotary screw—as, for example, the well-known Chambers brick-machines.

Specifically the invention relates to the expressing-screw in connection with the usual tapering former-die; and the object is to provide an improved form of screw which will deliver the clay to the former-die in a more direct line with relation to the sides of the latter, whereby the resistance of the clay to entering the "former" is diminished, with a consequent saving of power and less lamination or stratification of the clay in the issuing bar.

In carrying out my invention instead of making the pitch or angle of the screw-threads uniform from the body or core of the screw to its periphery, as heretofore—that is, instead of the line of the forward or working faces of the threads being parallel with each other—I give the outer or peripheral part thereof a greater pitch than that of the inner part adjacent to the body of the screw in such manner, as hereinafter explained, that the threads will be at a more acute angle to the major axis of the screw as they approach the point of the latter.

Referring now first to Figs. 1 and 2 of the accompanying drawings, 1 is the tapering screw on the end of the usual rotatable pugging-shaft (not shown) within the case 2. 3 is the former-die, tapering from its inner end and secured to the case 2. $1^a$ represents the threads of the screw, and it will be seen on referring especially to Fig. 2 that the pitch-lines of these threads are greater at the periphery than at and toward the body part of the screw and that the angle of the said lines to the major axis of the screw is more acute toward the forward end or point of the latter. This will be quite apparent on observing that the lines $a$ $a$ being extensions of the forward or working faces of the threads meet at a point $x$. It is desirable, although not absolutely essential, that the rear faces of the threads shall have a corresponding angle to that of the forward faces, as shown, the lines $b$ $b$ being extensions of said rear faces meeting at a point $y$, Fig. 2. It will be obvious that by reason of the construction shown and described the tendency will be for the screw to force forward the body of clay gradually upon convergent lines instead of upon parallel lines, as in the prior constructions. Consequently the direction of movement of the clay will correspond more nearly with the line of the tapering sides of the flaring mouth of the former-die. I remark that if the pitch-line of the threads continued at the same angle throughout the length of the screw the tendency would be for the latter to draw the clay from the side of the screw-case. In such case there would not exist the necessary pressure and friction of the clay against the latter to prevent the body of clay from turning around with the screw; but by suitably varying the angle of the pitch-line of the threads toward the point of the screw, as shown, such required pressure and friction are maintained at and near the starting-point, and the desired change in the movement of the clay into the former-die is effected.

The modification illustrated in Figs. 3 and 4 differs from the form of the device shown in Figs. 1 and 2 only in that in the latter the screw is a single-thread screw, while in Figs. 3 and 4 a double-thread screw is shown.

The same reference-marks are used in the several figures to designate the same or corresponding parts.

Although I have described my improvement as in connection with a brick-machine, it is equally applicable for use in machines of the kind wherein plastic material is or may be worked.

Having thus described my invention, I claim as new and desire to secure by Letters Patent—

1. An expressing-screw for brick-machines or the like, having its threads of greater pitch at the periphery than at and adjacent to the body of the screw.

2. An expressing-screw for brick-machines or the like, having its threads of greater pitch at the periphery than at and adjacent to the body of the screw, and the angle of the forward faces of which threads to the major axis of the screw decreases toward the forward end of the screw.

3. In a brick-machine or the like, the combination with the tapering former-die of the expressing-screw, having its threads of greater pitch at the periphery than at and adjacent to the body of the screw.

4. In a brick-machine, or the like, the combination with the tapering former-die, of the expressing-screw having its threads of greater pitch at the periphery than at and adjacent to the body of the screw, and the angle of the forward faces of which threads to the major axis of the screw decreases toward the forward end of the screw.

5. In a brick-machine or the like, the combination of the tapering former-die, the tapering screw-case and the tapering expressing-screw having the threads of greater pitch at the periphery than at and adjacent to the body of the screw, and the angle of the forward faces of which threads to the major axis of the screw decreases toward the forward end of the screw.

In testimony whereof I have hereunto affixed my signature this 19th day of June, A. D. 1900.

CYRUS CHAMBERS, Jr.

Witnesses:
  WALTER C. PUSEY,
  JOSHUA PUSEY.